US011920664B2

United States Patent
Dumas et al.

(10) Patent No.: US 11,920,664 B2
(45) Date of Patent: Mar. 5, 2024

(54) LIMITED-SLIP DIFFERENTIAL SYSTEM

(71) Applicant: BOMBARDIER RECREATIONAL PRODUCTS INC., Valcourt (CA)

(72) Inventors: Francois-Charles Dumas, Saint-Denis-de-Brompton (CA); Charles-Antoine Bonin, Roxton Pond (CA); Rejean Simard, Magog (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 17/854,611

(22) Filed: Jun. 30, 2022

(65) Prior Publication Data

US 2024/0003416 A1  Jan. 4, 2024

(51) Int. Cl.
| | |
|---|---|
| *F16H 48/22* | (2006.01) |
| *F16H 48/08* | (2006.01) |
| *F16H 48/27* | (2012.01) |
| *F16H 48/40* | (2012.01) |
| *F16H 57/037* | (2012.01) |

(52) U.S. Cl.
CPC ............. *F16H 48/22* (2013.01); *F16H 48/08* (2013.01); *F16H 48/40* (2013.01); *F16H 2048/085* (2013.01); *F16H 48/27* (2013.01); *F16H 57/037* (2013.01)

(58) Field of Classification Search
CPC .... F16H 48/22; F16H 48/26–27; F16H 48/32; F16H 57/037
See application file for complete search history.

(56) References Cited

U.S. PATENT DOCUMENTS

| | | | |
|---|---|---|---|
| 5,102,378 | A | 4/1992 | Gobert |
| 5,515,940 | A | 5/1996 | Shichinohe et al. |
| 5,520,589 | A | 5/1996 | Dewald et al. |
| 5,582,557 | A | 12/1996 | Dissett et al. |

(Continued)

FOREIGN PATENT DOCUMENTS

GB      858528 A  *  1/1961

OTHER PUBLICATIONS

Gassmann et al., VISCO-LOK: A Speed-Sensing Limited-Slip Device with High-Torque Progressive Engagement, Feb. 26-29, 1996, SAE Technical Paper Series, #960718.

*Primary Examiner* — Ernesto A Suarez
*Assistant Examiner* — James J Taylor, II
(74) *Attorney, Agent, or Firm* — BCF LLP

(57) ABSTRACT

A limited-slip differential system including a housing, a differential carrier disposed within the housing and including first and second carrier portions, a differential, a clutch pack and a pressure system is disclosed. The differential is configured to distribute torque from a drive shaft to first and second axles in accordance with a speed difference between the first and second axles. The pressure system is configured to selectively exert an axial force on the clutch pack, which includes first and second plurality of clutch plates respectively connected to one of the first and second carrier portions and a hub member, for selectively causing frictional engagement of the clutch plates. At least one of the first and second carrier portions at least partially defines at least one lubrication channel extending radially, and fluidly connecting an exterior of the differential carrier to an interior thereof for lubricating at least two clutch plates.

12 Claims, 10 Drawing Sheets

(56) References Cited

U.S. PATENT DOCUMENTS

| | | | |
|---|---|---|---|
| 5,632,185 A | 5/1997 | Gassmann | |
| 5,690,201 A | 11/1997 | Gassmann | |
| 5,865,701 A | 2/1999 | Sowa et al. | |
| 5,881,849 A | 3/1999 | Gassmann | |
| 5,916,052 A | 6/1999 | Dick | |
| 5,938,555 A | 8/1999 | Leeper | |
| 6,001,040 A | 12/1999 | Engle | |
| 6,041,903 A | 3/2000 | Burns et al. | |
| 6,056,658 A | 5/2000 | Illmeier | |
| 6,120,408 A * | 9/2000 | Yates, III | F16H 48/08 192/82 T |
| 6,216,841 B1 * | 4/2001 | Hofer | F16H 48/32 192/82 T |
| 6,491,126 B1 | 12/2002 | Robison et al. | |
| 7,231,847 B2 * | 6/2007 | Hibbler | F16H 57/037 74/606 R |
| 7,353,928 B2 * | 4/2008 | Yoshioka | F16D 43/284 192/85.02 |
| 7,438,167 B2 * | 10/2008 | Morgensai | F16H 48/34 475/88 |
| 7,445,088 B2 * | 11/2008 | Watanabe | F16H 57/0483 475/160 |
| 9,080,622 B2 * | 7/2015 | Edler | F16D 43/284 |
| 10,337,598 B2 * | 7/2019 | Bongard | F16H 57/0473 |
| 2018/0363681 A1 * | 12/2018 | Fox | F16H 48/32 |
| 2022/0010869 A1 * | 1/2022 | Kousaie | F16H 48/40 |

* cited by examiner

LIMITED-SLIP DIFFERENTIAL SYSTEM

TECHNICAL FIELD

The present technology relates to limited-slip differential systems.

BACKGROUND

Various types of differentials are conventionally used in vehicles to enable left wheels and right wheels to move at different speeds. One type of known differential is a limited-slip differential, which can transfer engine torque, when a wheel is slipping, to the wheel having more traction.

These limited-slip differentials generally include clutch packs having clutch plates that are disposed in a differential carrier. These clutch plates can be difficult to lubricate, which can result in high noise generation, increased wear and reduced torque transmission.

Therefore, there is a desire for a limited-slip differential that can overcome at least some of the above-described drawbacks.

SUMMARY

It is an object of the present technology to ameliorate at least some of the inconveniences present in the prior art.

According to one aspect of the present technology, there is provided a limited-slip differential system including a housing, a differential carrier, a differential, a clutch pack and a pressure system. The housing is configured to partially receive a drive shaft, a first axle, and a second axle. The differential carrier is disposed within the housing, and is rotatable relative to the housing. The differential carrier includes a first carrier portion, and a second carrier portion selectively connected to the first carrier portion. The differential is at least partially carried by the differential carrier, and is operatively connectable to the drive shaft, to the first axle, and to the second axle. The differential is configured to distribute torque from the drive shaft to the first and second axles in accordance with a speed difference between the first and second axles that is sensed by the limited-slip differential system. The clutch pack includes a first plurality of clutch plates rotationally fixedly connected to one of the first and second carrier portions, and a second plurality of clutch plates rotationally fixedly connected to a hub member fixedly connectable to one of the first and second axles. The clutch plates of the first and second pluralities of clutch plates are sequentially placed relative to one another. The pressure system is configured to selectively exert an axial force on the clutch pack for selectively causing frictional engagement of the first and second plurality of clutch plates with one another. At least one of the first and second carrier portions at least partially define at least one lubrication channel extending at least partially radially, the at least one lubrication channel fluidly connecting an exterior of the differential carrier to an interior thereof for lubricating at least two clutch plates of the clutch pack.

In some embodiments, the second pressure system includes a piston in contact with one of the clutch plates of the clutch pack, and a rotary pump operatively connectable between one of the first and second axles and the differential carrier. The rotatory pump is configured to selectively exert the axial force on the clutch pack.

In some embodiments, in response to the rotary pump generating a hydraulic pressure, the piston causes the first and second plurality of clutch plates to frictionally engage with one another thereby connecting the first and second axles and redistributing torque from one of the first and second axles with a higher angular velocity to another of the first and second axles with a lower angular velocity.

In some embodiments, the piston is made of aluminium.

In some embodiments, the differential is configured to enable the first and second axles to rotate at different angular velocities when the speed difference is below a predetermined threshold, and limit slip by progressively redistributing torque to one of the first and second axles in response to the speed difference between the first and second axles exceeding the predetermined threshold, the speed difference being sensed by the limited-slip differential system.

In some embodiments, the at least one lubrication channel is arcuate.

In some embodiments, the at least one lubrication channel is linear.

In some embodiments, the at least one lubrication channel is defined by the second carrier.

In some embodiments, the at least one lubrication channel is configured to guide lubricant from the exterior of the differential carrier to radial edges of the at least two clutch plates.

In some embodiments, the at least one lubrication channel includes four lubrication channels.

In some embodiments, the four lubrication channels are equally circumferentially spaced.

In some embodiments, the four lubrication channels are disposed symmetrically about a longitudinal plane.

In some embodiments, the differential includes a drive gear operatively connectable to the drive shaft, a ring gear engageable with the pinion gear, and fixedly connected to the differential carrier, a first side gear fixedly connected to the differential carrier, the first side gear being operatively connectable to the first shaft, a second side gear fixedly connected to the differential carrier, the second side gear being operatively connectable to the second shaft, and at least one pinion gear connected to the differential carrier, and engageable with the first and second side gears.

In some embodiments, the at least one pinion gear is two pinion gears, and the differential carrier includes a cross shaft extending through and fixedly connected the differential carrier and anchored therein for rotation therewith, the two pinion gears being rotationally mounted on the cross shaft such that the pinions gears configured to revolve with the differential case, and also able to rotate about the axis of the cross shaft to compensate for the speed difference between the first and second axles.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
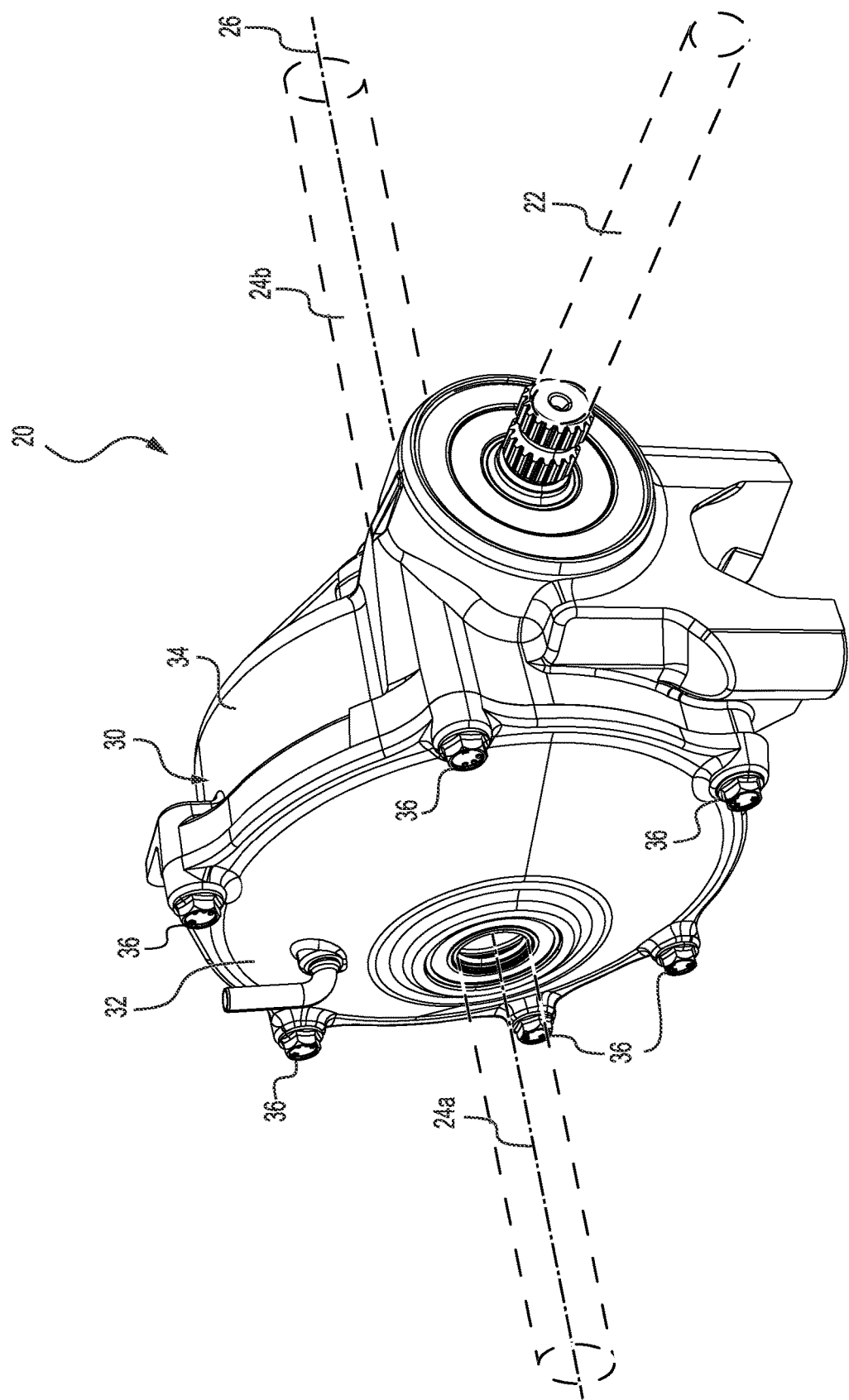
FIG. 1 is a perspective view taken from a top, rear, left side of a limited-slip differential system according to an embodiment of the present technology.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

The present technology discloses a limited-slip differential system. The limited-slip differential system includes a housing in which is disposed a differential carrier, a differential, a clutch pack and a pressure system. The differential carrier has two portions, one of which defines lubrication channels for providing a passage for lubricant to flow from the outside of the differential carrier to the inside thereof. This is notably useful to lubricate the clutch pack which is disposed within the differential carrier.

A limited-slip differential system 20 is shown in FIG. 1. The limited-slip differential system 20 is operatively connectable to an engine of a vehicle via a drive shaft 22 (shown schematically). The limited-slip differential system 20 is also operatively connectable to left and right wheels (not shown) via, respectively, left and right axles 24a, 24b (shown schematically). The limited-slip differential system 20 is configured to distribute torque to the axles 24a, 24b. As will be described below, the limited-slip differential system 20 is configured to enable the axles 24a, 24b to rotate at different angular speeds and is further adapted to limit slip of the wheels that are connected to the axles 24a, 24b by progressively redistributing torque to the wheel with greater traction in response to a difference in angular speed between the axles 24a, 24b exceeding a predetermined threshold.

The limited-slip differential system 20 includes a housing 30 configured to receive part of the drive shaft 22, and part of the axles 24a, 24b therein. The housing 30, as will become apparent from the following description, is also configured to receive components of the limited-slip differential system 20 therein. The housing 30 includes housing portions 32, 34 that are connected to one another via fasteners 36 such that the housing portions 32, 34 are selectively connected to one another. Though six fasteners 36 are shown in the accompanying figures, it is contemplated that there could be more or fewer than six fasteners in other embodiments. It is contemplated that in other embodiments, the housing portions 32, 34 could be connected to one another differently, for example via an adhesive. Though not shown herewith, a seal is provided between the housing portions 32, 34. The housing portions 32, 34 are shaped differently so as to tightly surround the components received therein.

Figure 2:
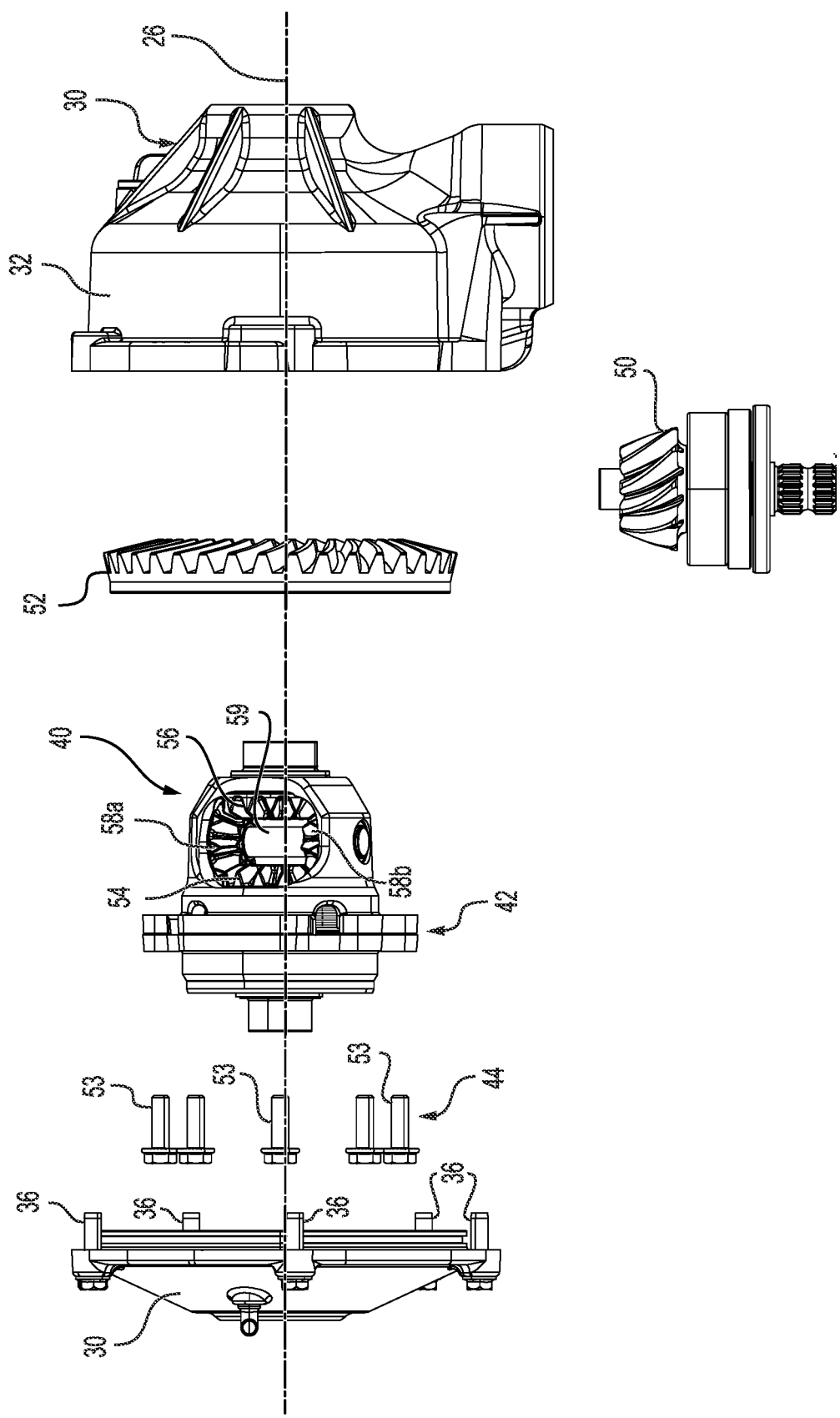
FIG. 2 is an exploded top view of the limited-slip differential system of FIG. 1.
Figure 3:
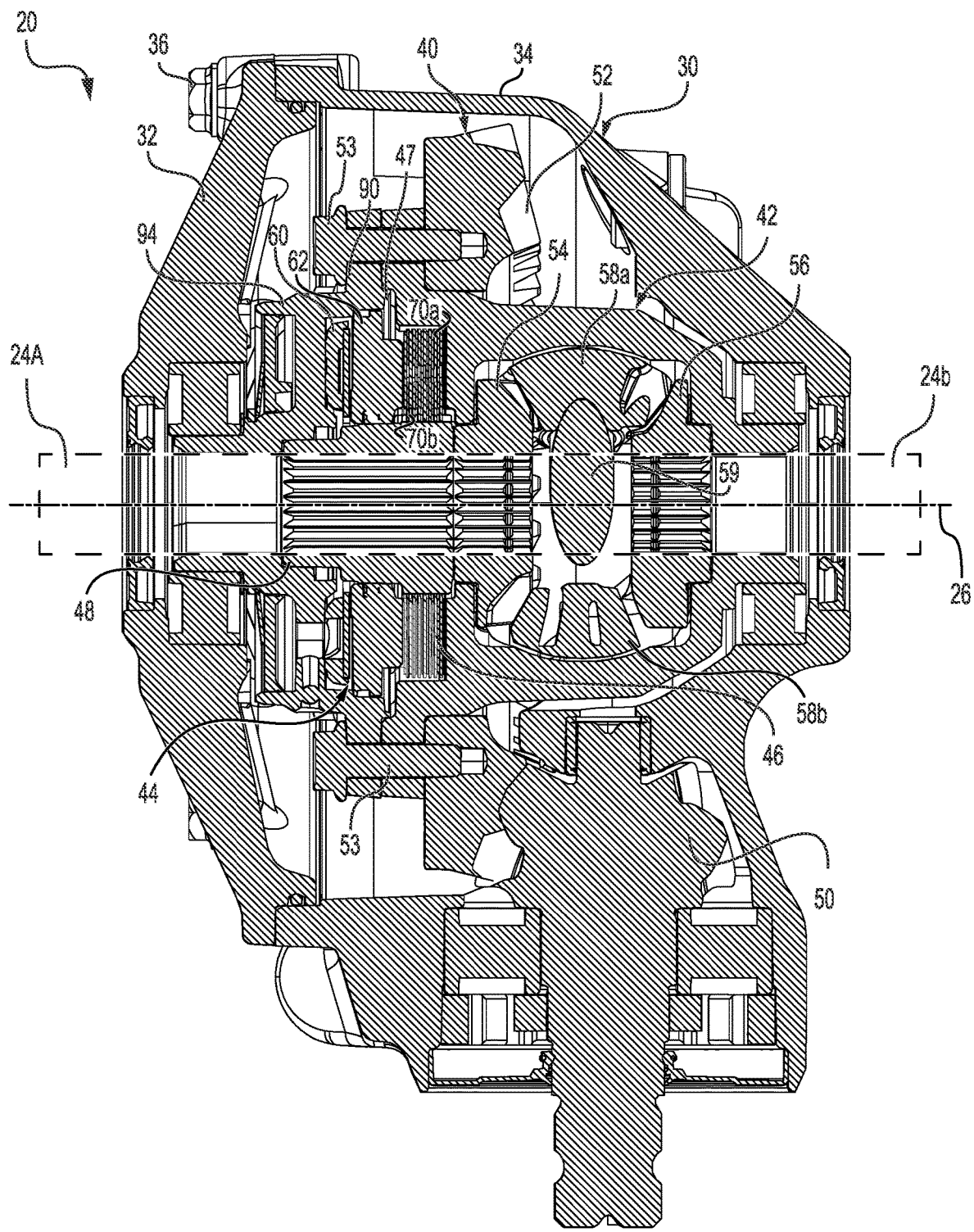
FIG. 3 is a cross-sectional view of the limited-slip differential system of FIG. 1 taken along a generally horizontal plane passing through a center of the limited-slip differential system.
Figure 4:
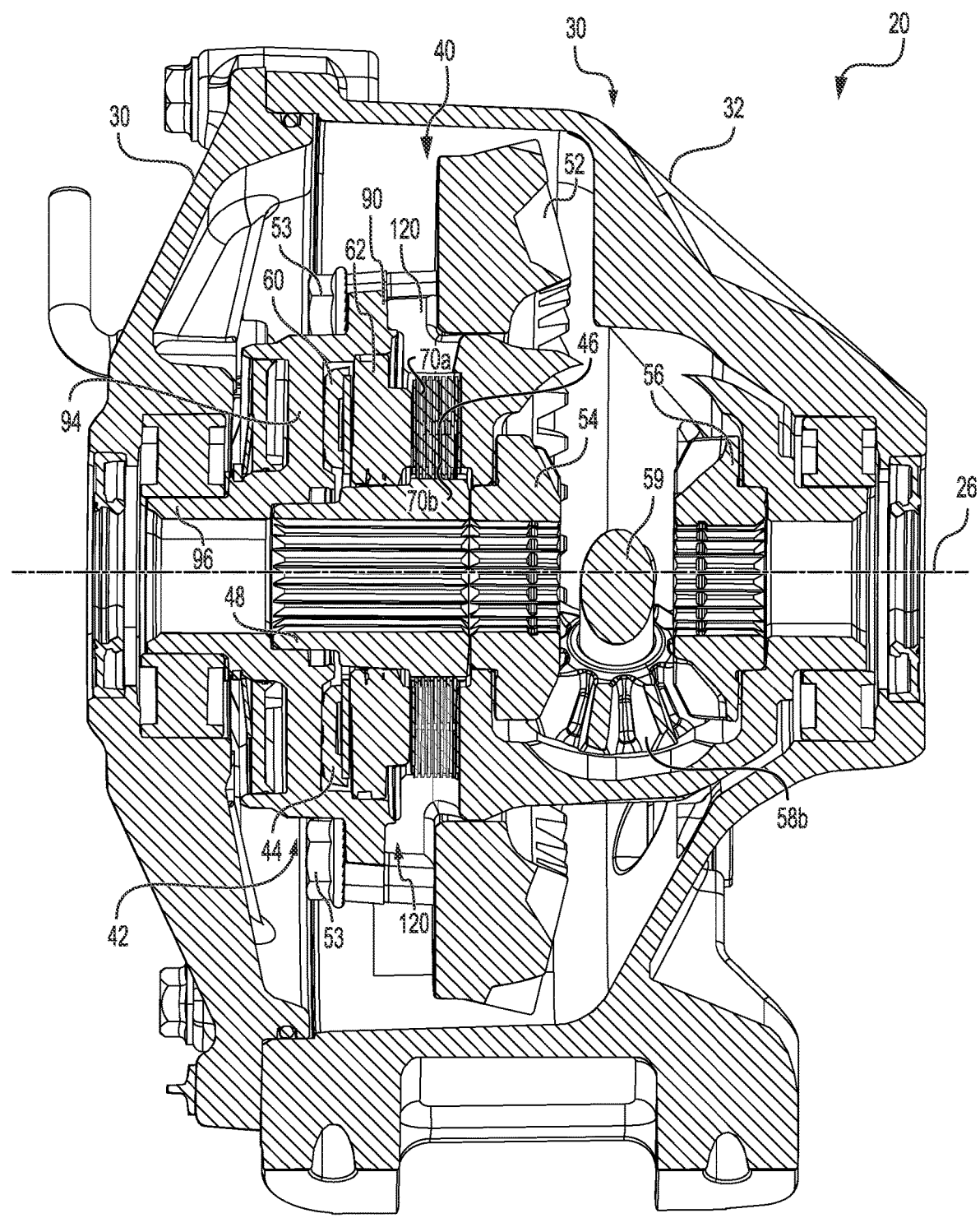
FIG. 4 is a cross-sectional view of the limited-slip differential system of FIG. 1 taken along a longitudinal plane passing through two lubrication channels of a differential carrier.
Figure 5:
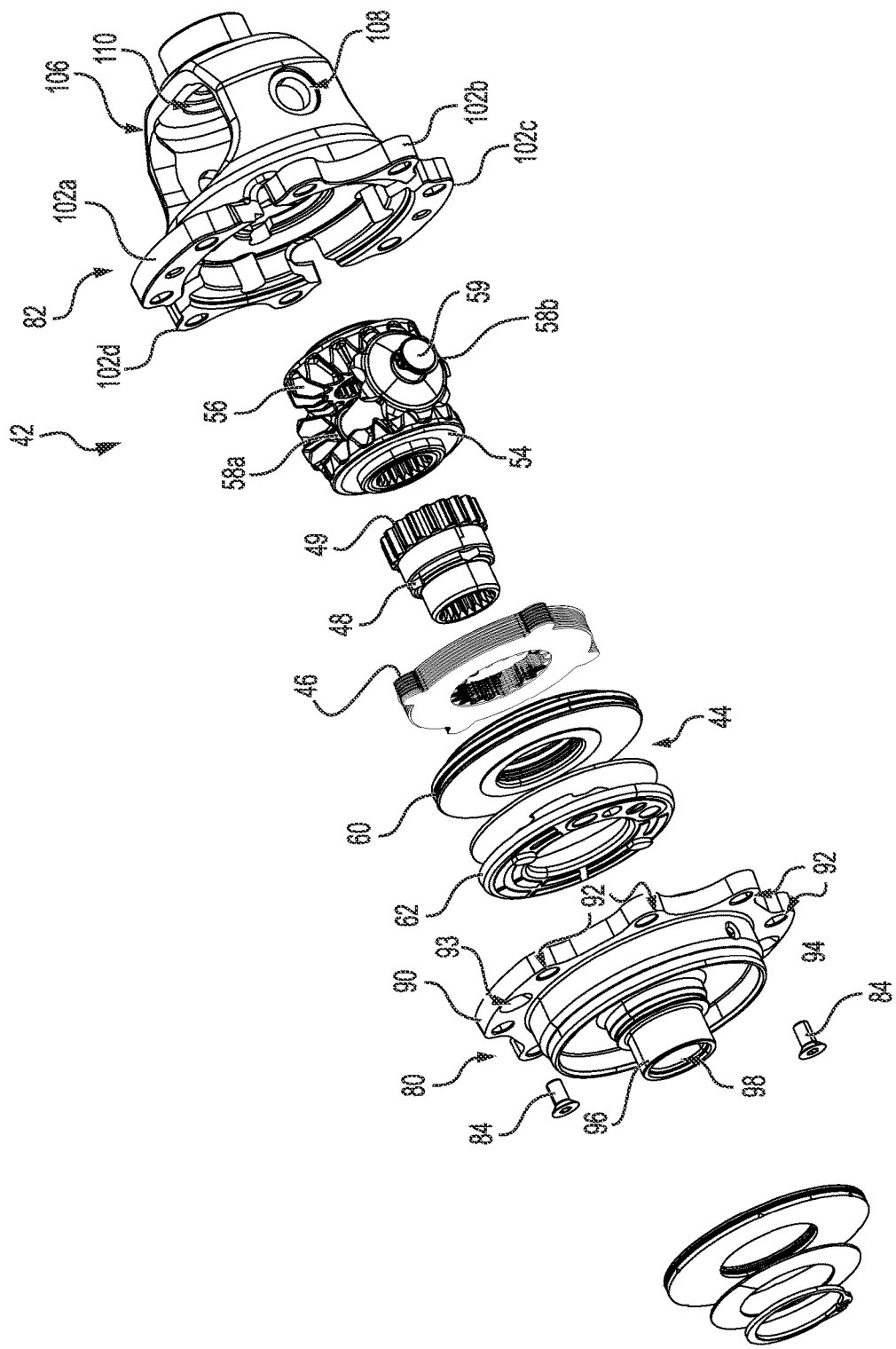
FIG. 5 is an exploded view of a differential carrier of the limited-slip differential system of FIG. 1.
Figure 6:
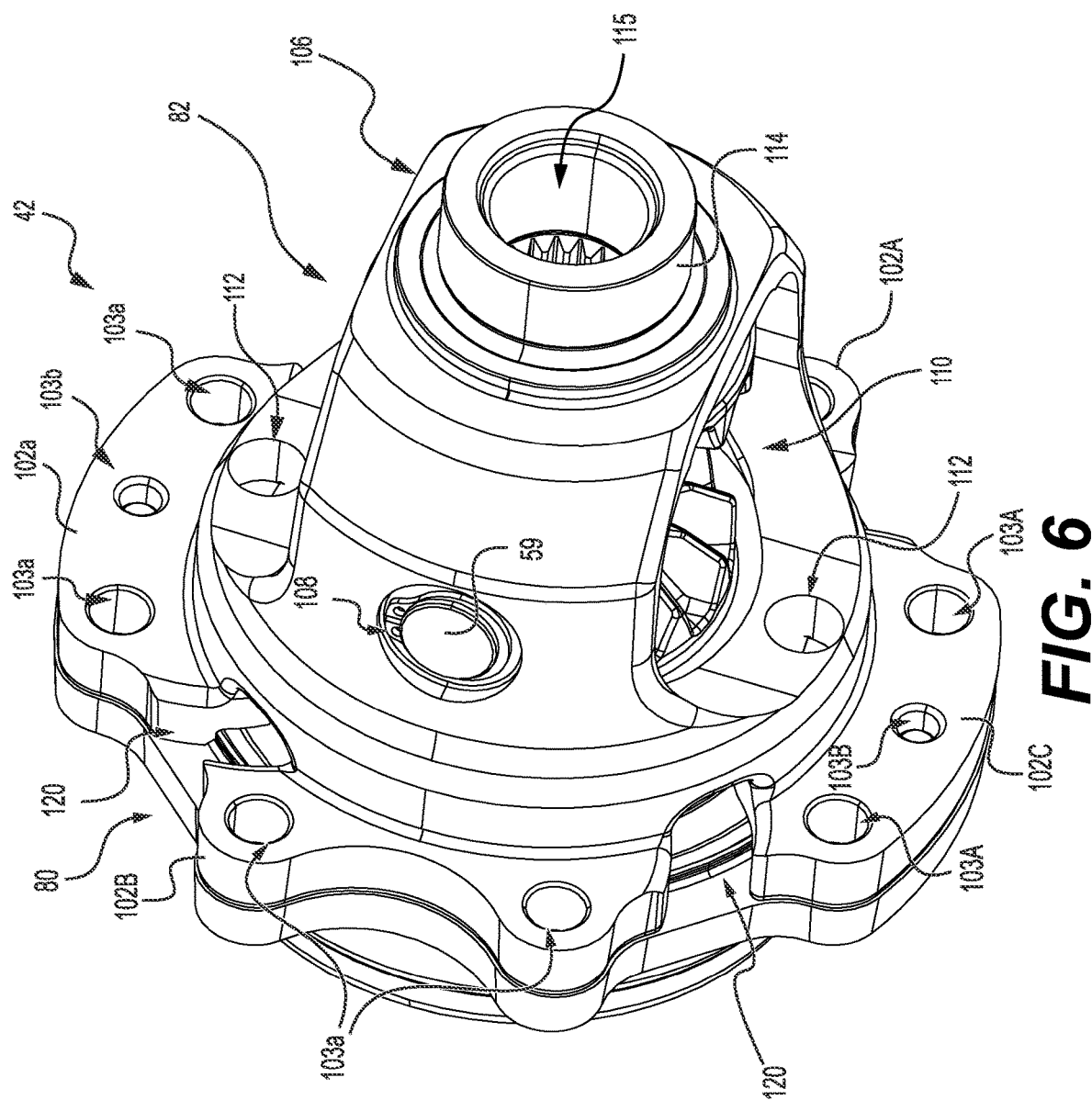
FIG. 6 is a perspective view taken from a rear, right side of the differential carrier of FIG. 5.
Figure 7:
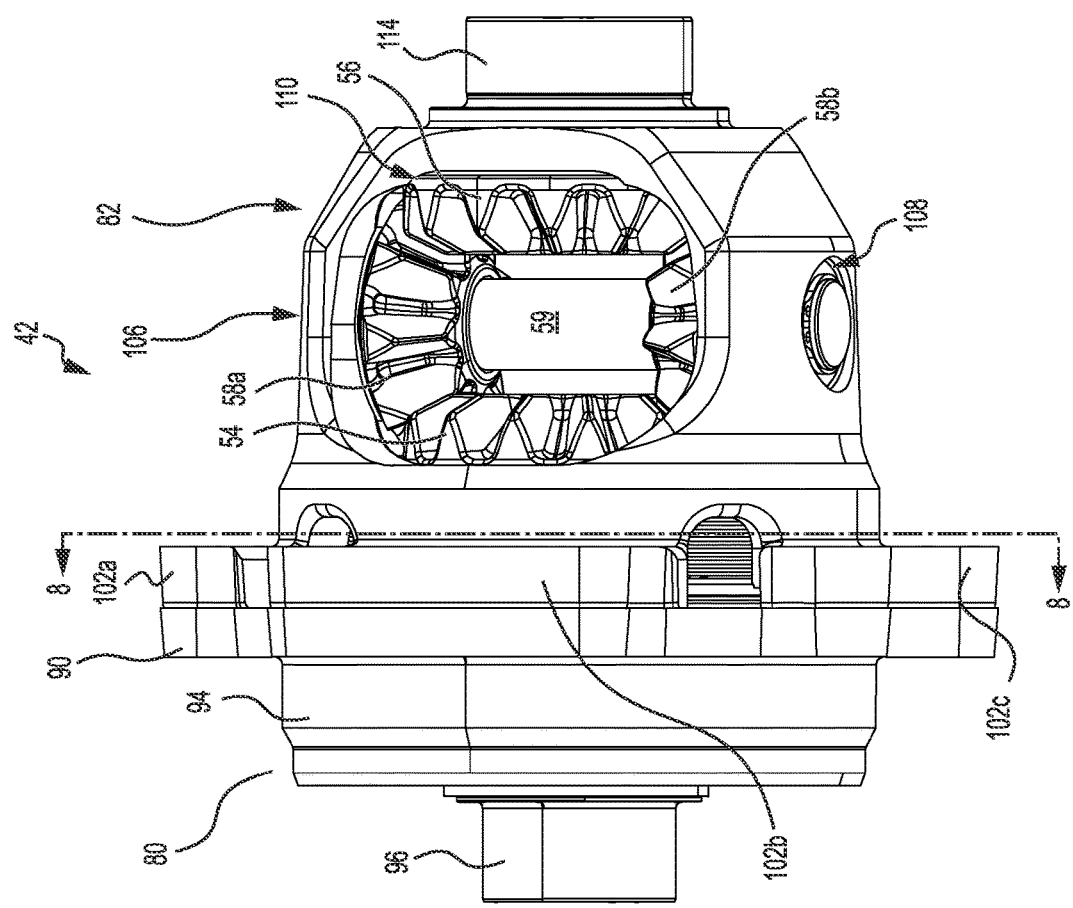
FIG. 7 is a rear elevation view of the differential carrier of FIG. 5.

With reference to FIGS. 2 to 4, the limited-slip differential system 20 also includes a differential 40, a differential carrier 42, a pressure system 44, a clutch pack 46 and a hub member 48, all of which are, at least partially, housed in the housing 30. A description of the differential 40, which includes a drive gear 50, a ring gear 52, a side gear 54, a side gear 56 and two pinion gears 58a, 58b, will now be provided.

The drive gear 50 is operatively connectable to the drive shaft 22 such that in response to the drive shaft 22 rotating, the drive gear 50 rotates. The drive gear 50 is in operational engagement with the ring gear 52.

The ring gear 52 is fixedly connected to the differential carrier 42 via fasteners 53. The fasteners 53 are bolts such that the ring gear 52 is removably connected to the differential carrier 42. It is contemplated that other fasteners could be used. In some embodiments, the ring gear 52 could be permanently connected to the differential carrier 42. As the ring gear 52 is fixedly connected to the differential carrier 42, in response to the ring gear 52 rotating, the differential carrier 42 also rotates.

The side gears 54, 56 are received in the differential carrier 42. The side gear 54 is operationally connectable to the axle 24a, whereas the side gear 56 is operationally connectable to the axle 24b. Thus, in response to the side gear 54 rotating, the axle 24a rotates and in response to the side gear 56 rotating, the axle 24b rotates.

The pinion gears 58a, 58b, which are also received in the differential carrier 42, are interconnected by a cross-shaft 59 that extends through the housing 30 such that the cross-shaft 59 is fixed relative to the differential carrier 42. As a result, the ring gear 52, the differential carrier 42 and the pinion gears 58a, 58b can all revolve about an axle axis 26. The axle axis 26 is aligned with the axles 24a, 24b. It is contemplated that in other embodiments, there could be more or less than two pinion gears. Furthermore, the pinion gears 58a, 58b are operationally engageable with the side gears 54, 56 to transmit motion therebetween.

Referring to FIGS. 5 to 8, the differential carrier 42 is generally configured to carry the ring gear 52, the side gears 54, 56 and the pinion gears 58a, 58b. The differential carrier 42 is also configured to receive the clutch pack 46, the pressure system 44 and the hub member 48 therein. The differential carrier 42 will be described in greater detail below.

The pressure system 44, as mentioned, is received in the differential carrier 42. More precisely, the pressure system 44 is rotatably mounted to the differential carrier 42. The pressure system 44 includes a rotary pump 60 and a piston 62, both of which are configured to be disposed between the axle 24a and the differential carrier 42. It is contemplated that in other embodiments, the pressure system 44 could be different from the one described herewith.

The pump 60 defines a closed fluid system that is isolated from fluid communication from the remaining portions of the limited-slip differential system 20 (e.g., the fluid that lubricates side gears 54, 56 and pinions 58a, 58b). The closed fluid system of the pump 60 could utilize silicone gel as the lubricant, for example, because of its high viscosity and high thermal expansion rate.

The piston 62 is operatively connected to the rotary pump 60 and is in contact with the clutch pack 46. The piston 62 includes seals that help to isolate fluid from the pump 60. The piston 62 is made of aluminum. It is contemplated that in other embodiments, the piston 62 could be made of other material. As will be described in greater detail below, the piston 62 being made of aluminum instead of plastic can increase the locking torque of the limited-slip differential system 20.

As will be described below, in response to a difference between the angular velocities of the axles 24a, 24b, the pump 60 is configured to produce a hydraulic pressure to move the piston 62 to exert an axial force on the clutch pack 46.

The clutch pack 46, as mentioned above, is configured to be received in the differential carrier 42. The clutch pack 46 includes a plurality of clutch plates, made up of a plurality of carrier plates 70a and a plurality of hub plates 70b. The clutch plates 70a, 70b are sequentially placed relative to one another. In other words, within the clutch pack 46, the carrier plate 70a is followed by a hub plate 70b, which is in turn followed by a carrier plate 70a, and so on and so forth. The clutch plates 70a, 70b are axially spaced from one another.

Each one of the carrier plates 70a has four locking projections 72a (best seen in FIG. 8) that are equally circumferentially spaced and that project radially outwardly from an outer edge of the respective carrier plate 70a. It is contemplated that in some embodiments, the four locking projections 72a could have various circumferential spacing. The locking protrusions 72a are configured to be received in recesses 104 defined in the differential carrier 42, and for rotationally fixing the carrier plates 70a to the differential carrier 42.

Figure 8:
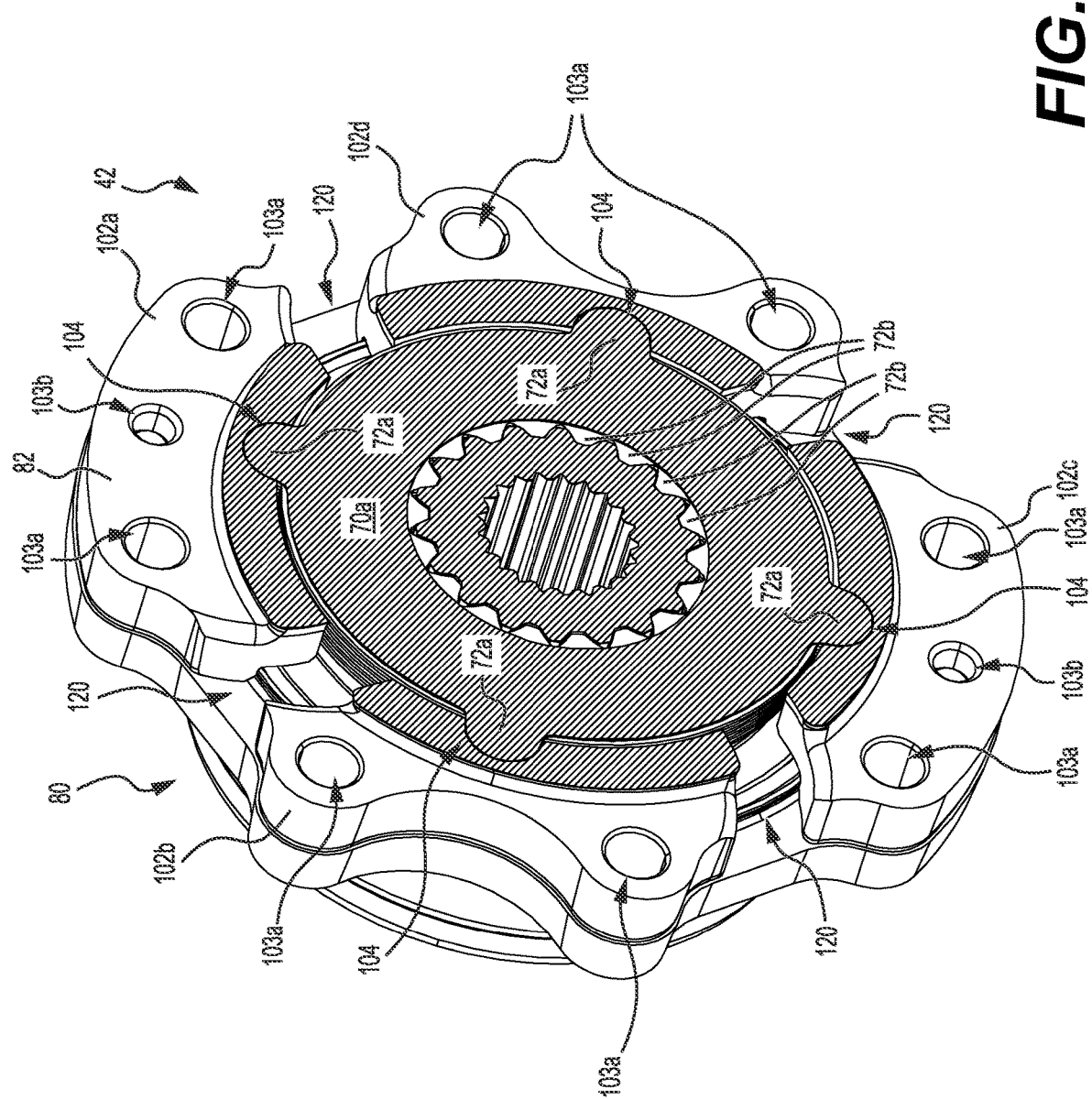
FIG. 8 is a cross-sectional perspective view of the differential carrier of FIG. 5 taken along the line 8-8 of FIG. 7.

Each one of the hub plates 70b has a plurality of projections 72b (best seen in FIG. 8). The projections 72b project radially inwardly from an inner edge of the hub plates 70b. The projections 72b are configured to engage with projections 49 extending from the hub member 48 and are for rotationally fixing the hub plates 70b to the hub member 48.

In operation, when the piston 62 exerts an axial force on the clutch pack 46, the clutch plates 70a, 70b move towards one another until there is frictional engagement between the clutch plates 70a, 70b. Eventually, the clutch plates 70a, 70b are fixed relative to one another.

The hub member 48, sometimes referred to as an inner plate carrier, is received in the differential carrier 42. The hub member 48 is received in apertures defined in the pump 60 and the piston 62. Also, the hub member 48 has the projections 49 for being rotationally fixed relative to the hub plates 70b. The hub member 48 is also operatively connectable to the axle 24a, such that when the axle 24a rotates, the hub member 48 also rotates.

With continued reference to FIGS. 5 to 8, the differential carrier 42 will now be described in greater detail. The differential carrier 42 includes a carrier portion 80 and a carrier portion 82. The carrier portions 80, 82 are connected to one another via fasteners 84. The fasteners 53 also assist in connecting the carrier portions 80, 82 to one another (see FIG. 2). The fasteners 84 are bolts such that the carrier portions 80, 82 are removably connected to one another. It is contemplated that other fasteners could be used.

The carrier portion 80 has at a base thereof a connecting segment 90. The connecting segment 90 defines apertures 92 which receive the fasteners 53 therein. The connecting segment 90 also defines apertures 93 which receive the fasteners 84 therein. Radially inwardly from the connecting segment 90 the carrier portion 80 has an intermediate segment 94 that is configured to abut the pressure system 44. Radially inwardly from the intermediate segment 94, the carrier portion 82 includes a hub segment 96 that extends axially. The hub segment 96 defines an aperture 98 that is configured to receive the axle 24a therein. The hub segment 96 is also engaged with the hub member 48.

The carrier portion 82 is longer than the carrier portion 80 and is generally shaped like a hollow dome, so as to receive components therein. It is contemplated that in other embodiments, the carrier portion 82 could be sized differently.

At a base thereof, the carrier portion 82 has four connecting segments 102a, 102b, 102c, 102d. The four connecting segments 102a, 102b, 102c, 102d are separated by lubrication channels 120, which will be described in greater detail below. Each of the four connecting segments 102a, 102b, 102c, 102d defines axially extending apertures 103a that receive the fasteners 53. The connecting segments 102a, 102c also define axially extending apertures 103b that are configured to receive the fasteners 84. Furthermore, each of the connecting segments 102a, 102b, 102c, 102d defines, on a radially inner edge thereof, a locking recess 104 (shown in FIG. 8) configured to receive one of the locking protrusions 72a.

Extending axially from the connecting segments 92, the carrier portion 82 has a receiving section 106 configured to receive the side gears 54, 56 and the pinions 58a, 58b therein. The receiving section 106 defines two apertures 108 opposite to one another configured to receive the cross-shaft 59. The receiving section 106 also defines two access apertures 110 that are relatively large and enable access to the interior of the receiving section. The receiving section 106 further defines two lubrication apertures 112 that extends axially through the receiving section 106.

Extending axially from the receiving section 106, the carrier portion 82 also has a hub section 114 that defines an aperture 115 configured to receive the axle 24b therein.

The lubrication channels 120 will now be described in greater detail. The lubrication channels 120 are defined by the carrier portion 82. It is contemplated that in other embodiments, the lubrication channels 120 could be defined by the carrier portion 80. It is further contemplated that in other embodiments, the lubrication channels 120 could be partially defined by both of the carrier portions 80, 82. In the present embodiment, the carrier portion 82 defines four lubrication channels 120. It is contemplated that in other embodiments, there could be more or fewer than four lubrication channels. Thus, in some embodiments, there could be more or fewer than four connecting segments. The four lubrication channels 120 are equally circumferentially spaced. It is contemplated that in other embodiments, the lubrication channels 120 could have various circumferential spacing. Additionally, the lubrication channels 120 are arcuate. As will be described below, the lubrication channels 120 being arcuate may help enhance flow of lubricant therethrough when the clutch pack 46 rotates.

The lubrication channels 120 extend radially throughout the carrier portion 82, such that the lubrication channels 120 provide a passage from an exterior of the carrier portion 82 to an interior of the carrier portion 82. In other words, the lubrication channels 120 fluidly connect the exterior of the differential carrier 42 to the interior of the differential carrier 42.

The lubrication channels 120 also extend axially along a portion of the carrier portion 82. More precisely, the lubrication channels 120 are configured to be generally axially aligned with the clutch pack 46 when the limited-slip differential system 20 is fully assembled (best seen in FIG. 4).

Thus, when there is lubricant in the housing 30, the lubricant can flow from outside the differential carrier 42 to the inside thereof by the way of the lubrication channels 120. Since the lubrication channels 120 extend axially, the lubricant is guided to flow across all of the clutch plates 70a, 70b. In some embodiments, the lubrication channels 120 could be configured to flow across a portion of the clutch plates 70a, 70b. In the present embodiment, the lubricant is configured to flow across radial edges of the clutch plates 70a, 70b. The lubrication channels 120 being arcuate can help enhance lubricant flow rate from the outside of the differential carrier 42 to the inside thereof, particularly when the clutch pack 46 rotates.

It is to be noted that when there is lubricant within the housing 30, the lubricant can also flow to the inside of the differential carrier 42 through the lubrication apertures 112. However, entry of lubricant therefrom is limited by one of the clutch plates 70a, 70b closest to the lubrication apertures 112.

Thus, the lubrication channels 120 in some cases could provide better lubrication of the clutch plates 70a, 70b. Notably, there may be a reduction of noise during operation of the clutch pack 46 compared to clutch packs not equipped with the herein described lubrication channels 120.

Additionally, better lubrication may aid in extending life of each of the clutch plates 70a, 70b. Furthermore, the enhanced lubrication of the clutch plates 70a, 70b may result in better thermal dissipation, which can also result in improving the locking torque differential, and holding maximum torque for longer duties. Additionally, since, as mentioned above, the piston 62 is made of aluminum, the piston 62 may also benefit from improved lubrication, in some cases, possible from the presence of the lubrication channels 120 by having enhanced thermal dissipation. Additionally, in operation, the lubricant will expand more while as a temperature thereof rises, therefore increasing the pressure on the piston 62. As a result of the increased pressure on the piston 62, the locking torque of the clutch plates 70a, 70b will also increase.

Figure 9:
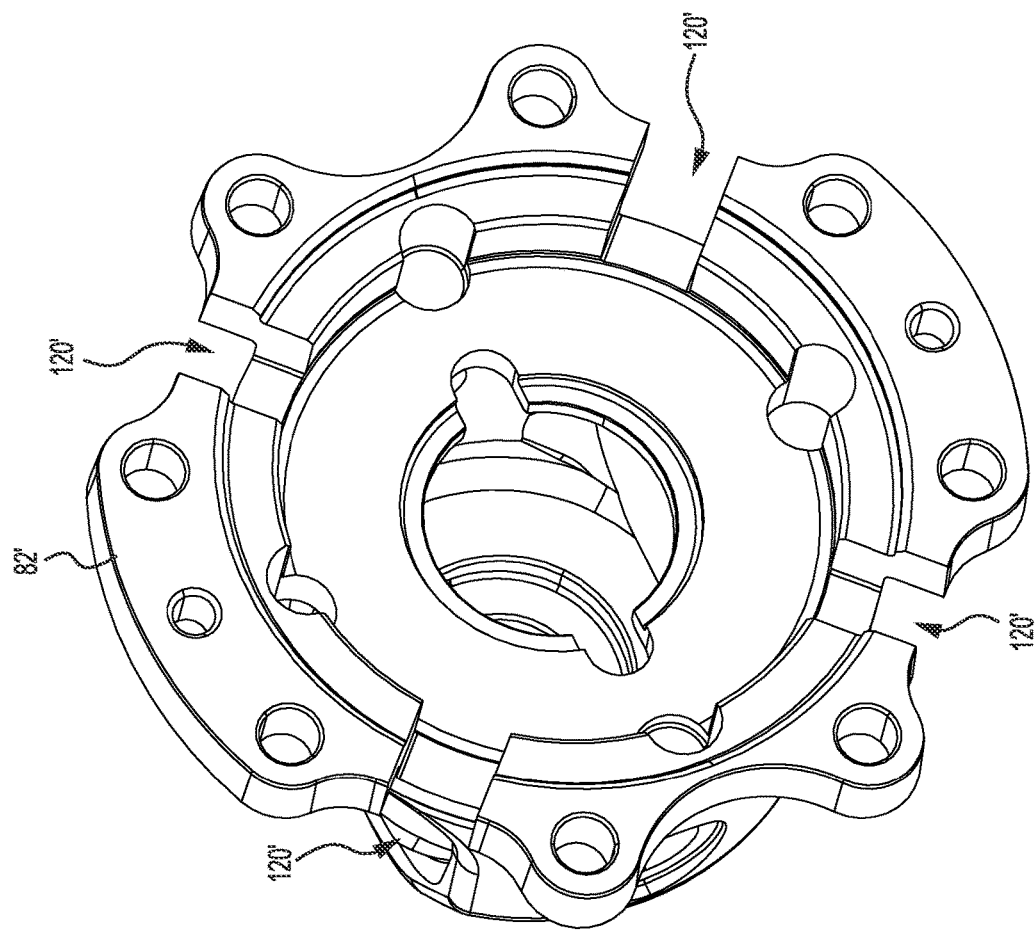
FIG. 9 is a perspective view taken from a rear, left side of a differential portion of a differential carrier of a limited-slip differential system according to another embodiment of the present technology.
Figure 10:
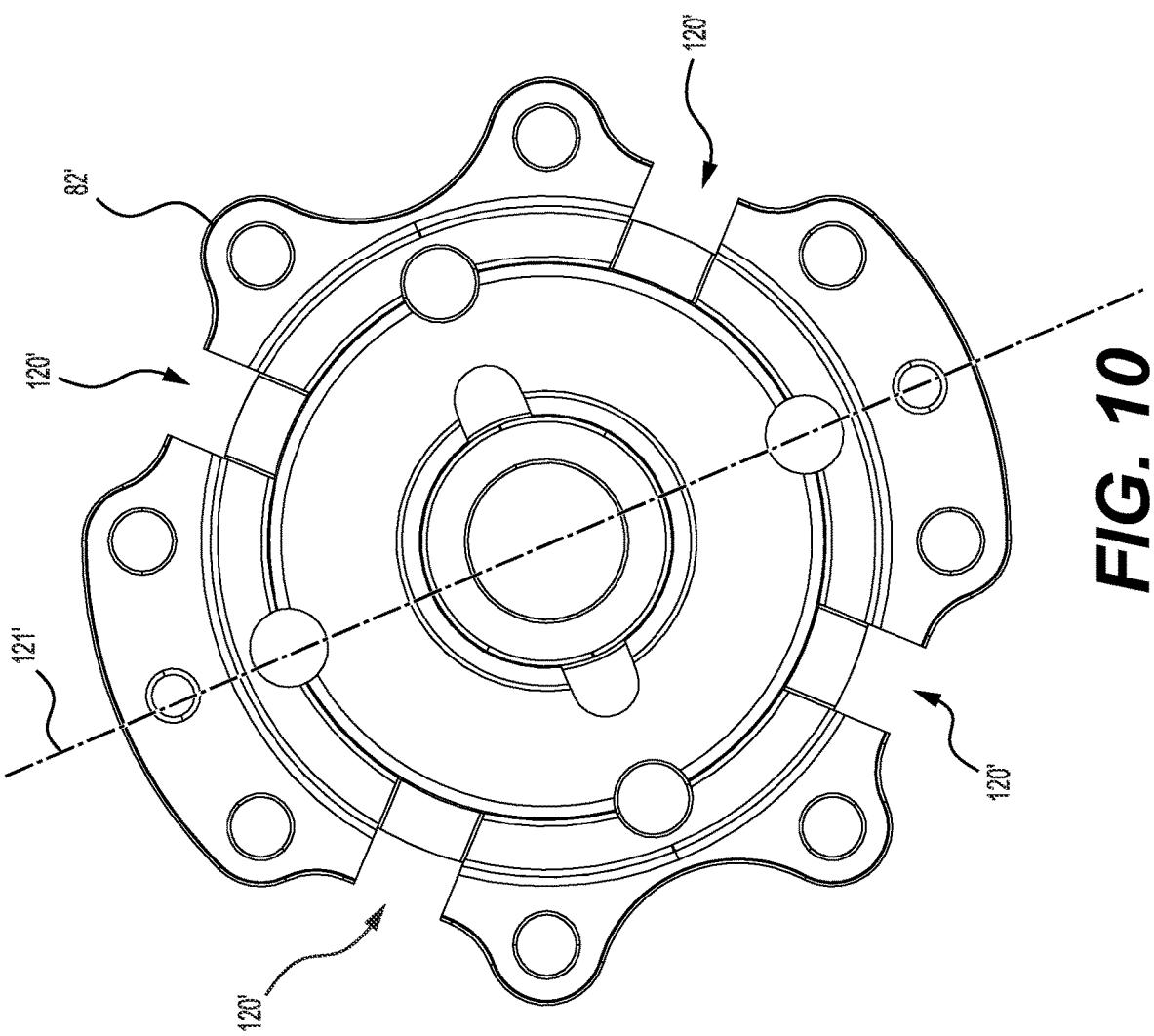
FIG. 10 is a right side elevation view of the differential portion of FIG. 9.

An alternative embodiment of the carrier portion 82, namely carrier portion 82', is shown in FIGS. 9 and 10. As the carrier portion 82 is generally similar to the carrier portion 82', portions of the carrier portion 82' similar to the carrier portion 82 will not be described again herewith.

The carrier portion 82' differs from the carrier portion 82 in that the lubrication channels 120' are linear, extending radially outward from a center of the carrier portion 82'. Furthermore, the lubrication channels 120 are disposed symmetrically about a plane 121'. The plane 121' passes through a center of the differential carrier 42 (i.e., through the apertures 103b). It is contemplated that in some embodiments, the lubrication channels 120' could not be defined symmetrically about a symmetry plane.

It is contemplated that in other embodiments of the present technology, one or more of the lubrication channels 120 could be arcuate, and others could be linear.

The remainder of the description will be described with reference to the carrier portion 82 and the lubrication channels 120, though it is understood that the same applies to the carrier portion 82'.

Briefly, a description of the limited-slip differential system 20 in operation (i.e., when the limited-slip differential system 20 is connected to the drive shaft 22 and the axles 24a, 24b) will be provided.

In operation, the drive gear 50 which is operatively connected to the drive shaft 22 engages the ring gear 52. The ring gear 52 is mounted to the differential carrier 42 so that when the ring gear 52 revolves about the axle axis 26, the differential carrier 42 also revolves about the axle axis 26. Additionally, as the differential carrier 42 revolves, the pinions 58a, 58b revolve as well. The side gears 54, 56 are rotationally fixed to the axles 24a, 24b whereby any rotation of the side gears 54, 56 causes wheels (not shown) connected to the axles 24a, 24b to rotate therewith. In this manner, the limited-slip differential system 20 operates like a standard open differential. If there is a difference in traction between the left and right wheels, the torque from the drive gear 50 will be transferred to the wheel under less tractions, this will cause a difference in rotation speed between the wheels and cause the pinions 58a, 58b to start to rotate about the axis of cross shaft 59.

However, when the speed difference between the respective wheels of the axles 24a, 24b, which is sensed by the limited-slip differential system 20, exceeds a predetermined threshold (called the "cutting point"), the limited-slip differential system 20 transmutes from an open differential to a progressive limited-slip differential. The "cutting point" has a predetermined value, for example 1 to 15 RPM. It is contemplated that the cutting point could have another value in other embodiments. At the cutting point, the difference in axle speeds causes the rotary pump 60 to build up a pressure so as to drive the piston 62 against the clutch pack 46. Driving the piston 62 against the clutch pack 46 causes the carrier plates 70a and the hub plates 70b to move towards one another until the carrier and hub plates 70a, 70b are frictionally engaged with one another. This engagement limits wheel slip by transferring torque to the wheel that has greater traction (i.e., the wheel that is spinning less). The greater the difference in angular velocity between the axles 24a, 24b, the greater is the pressure generated by the pump 60. At the "cutting point", any further increase in difference in wheel speed results in a linearly proportional increase in torque transfer, producing a progressive differential response.

Below the cutting point, the torque variation across the clutch pack may be zero or a small constant value. Sometimes, the clutch pack 46 is pre-loaded by a spring 47 (shown in FIGS. 3 and 4), in which case the torque variation across the clutch pack 46 (for a difference in wheel speed less than the cutting point) can be a small constant value.

Thus, the limited-slip differential system 20 initially functions practically like an open differential, allowing optimal steering unencumbered by the limited-slip coupling. In response to the difference in wheel speed of respective axles 24*a*, 24*b* exceeding the "cutting point", the differential 40 engages, progressively transferring torque to the wheel with greater traction as a function of the difference in wheel speed. As the difference in wheel speed increases, the transfer of torque increases in a virtually linear fashion. Unlike the regressive differential, there is no plateau of torque transfer. Thus, in extreme conditions, the amount of torque transferred will be much larger than what could be transferred under similar circumstances by a regressive-type limited-slip.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A limited-slip differential system comprising:
   a housing configured to partially receive a drive shaft, a first axle, and a second axle;
   a differential carrier disposed within the housing, the differential carrier being rotatable relative to the housing, the differential carrier including:
      a first carrier portion, and
      a second carrier portion selectively connected to the first carrier portion;
   a differential at least partially carried by the differential carrier, the differential being operatively connectable to the drive shaft, to the first axle, and to the second axle, the differential being configured to distribute torque from the drive shaft to the first and second axles in accordance with a speed difference between the first and second axles that is sensed by the limited-slip differential system;
   a clutch pack including a first plurality of clutch plates rotationally fixedly connected to at least one of the first and second carrier portions, and a second plurality of clutch plates rotationally fixedly connected to a hub member fixedly connectable to one of the first and second axles, the clutch plates of the first and second pluralities of clutch plates being sequentially placed relative to one another;
   a pressure system configured to selectively exert an axial force on the clutch pack for selectively causing frictional engagement of the clutch plates of the first and second plurality of clutch plates with one another,
   at least one of the first and second carrier portions at least partially defining at least one lubrication channel extending at least partially radially, the at least one lubrication channel fluidly connecting an exterior of the differential carrier to an interior thereof for lubricating at least two clutch plates of the clutch pack, the at least one lubrication channel being arcuate such that a radially inner end of the at least one lubrication channel is circumferentially offset from a radially outer end of the at least one lubrication channel, and the at least one lubrication channel being axially aligned with the at least two clutch plates for guiding lubricant from the exterior of the differential carrier to radial edges of the at least two clutch plates.

2. The limited-slip differential system of claim 1, wherein the pressure system includes:
   a piston in contact with one of the clutch plates of the clutch pack; and
   a rotary pump operatively connectable between one of the first and second axles and the differential carrier, the rotary pump being configured to selectively exert the axial force on the clutch pack.

3. The limited-slip differential system of claim 2, wherein, in response to the rotary pump generating a hydraulic pressure, the piston causes the clutch plates of the first and second plurality of clutch plates to frictionally engage with one another thereby connecting the first and second axles and redistributing torque from one of the first and second axles with a higher angular velocity to another of the first and second axles with a lower angular velocity.

4. The limited-slip differential system of claim 2, wherein the piston is made of aluminium.

5. The limited-slip differential system of claim 1, wherein the differential is configured to:
   enable the first and second axles to rotate at different angular velocities when the speed difference is below a predetermined threshold, and
   limit slip by progressively redistributing torque to one of the first and second axles in response to the speed difference between the first and second axles exceeding the predetermined threshold, the speed difference being sensed by the limited-slip differential system.

6. The limited-slip differential system of claim 1, wherein the at least one lubrication channel is defined by the second carrier.

7. The limited-slip differential system of claim 1, wherein the at least one lubrication channel includes four lubrication channels.

8. The limited-slip differential system of claim 7, wherein the four lubrication channels are equally circumferentially spaced.

9. The limited-slip differential system of claim 7, wherein the four lubrication channels are disposed symmetrically about a longitudinal plane.

10. The limited-slip differential system of claim 1, wherein the differential includes:
    a drive gear operatively connectable to the drive shaft;
    a ring gear engageable with the drive gear, and fixedly connected to the differential carrier;
    a first side gear fixedly connected to the differential carrier, the first side gear being operatively connectable to the first axle,
    a second side gear fixedly connected to the differential carrier, the second side gear being operatively connectable to the second axle, and
    at least one pinion gear connected to the differential carrier, and engageable with the first and second side gears.

11. The limited-slip differential system of claim 10, wherein the at least one pinion gear is two pinion gears, and the differential carrier includes a cross shaft extending through and fixedly connected the differential carrier and anchored therein for rotation therewith, the two pinion gears being rotationally mounted on the cross shaft such that the two pinions gears are configured to revolve with the differential carrier, and also able to rotate about an axis of the cross shaft to compensate for the speed difference between the first and second axles.

12. The limited-slip differential system of claim 1, wherein the at least one of the first and second carrier portions includes:
   a receiving section configured to receive at least part of the differential; and
   at least two connecting segments extending generally orthogonally from the receiving section, the at least two connecting segments defining the at least one lubrication channel therebetween, and each one of the at least two connecting segments defining an aperture for receiving a fastener therein.

* * * * *